(12) United States Patent
Sasaki et al.

(10) Patent No.: US 12,189,070 B2
(45) Date of Patent: Jan. 7, 2025

(54) SURVEYING INFORMATION MANAGEMENT SYSTEM, SURVEYING INFORMATION MANAGEMENT METHOD, AND STORAGE MEDIUM STORING SURVEYING INFORMATION MANAGEMENT PROGRAM

(71) Applicant: Topcon Corporation, Tokyo (JP)

(72) Inventors: Takeshi Sasaki, Tokyo (JP); Norikatsu Shibata, Tokyo (JP); Nobuyuki Fukaya, Tokyo (JP)

(73) Assignee: Topcon Corporation, Tokyo (JP)

( * ) Notice: Subject to any disclaimer, the term of this patent is extended or adjusted under 35 U.S.C. 154(b) by 363 days.

(21) Appl. No.: 17/654,999

(22) Filed: Mar. 16, 2022

(65) Prior Publication Data

US 2022/0299665 A1 Sep. 22, 2022

(30) Foreign Application Priority Data

Mar. 19, 2021 (JP) .................................. 2021-045446
Sep. 30, 2021 (JP) .................................. 2021-160901
Sep. 30, 2021 (JP) .................................. 2021-160902

(51) Int. Cl.
*G01V 1/00* (2006.01)
*G01V 1/18* (2006.01)
(Continued)

(52) U.S. Cl.
CPC ................ *G01V 1/003* (2013.01); *G01V 1/18* (2013.01); *G01V 1/247* (2013.01); *G06T 7/80* (2017.01);
(Continued)

(58) Field of Classification Search
CPC .......... G01V 1/003; G01V 1/18; G01V 1/247; G06T 7/00; G06T 7/0002; G06T 7/10;
(Continued)

(56) References Cited

U.S. PATENT DOCUMENTS 11,004,250 B2 5/2021 Yasutomi et al.
2016/0327647 A1* 11/2016 Herbst ................. G01C 15/002
(Continued)

FOREIGN PATENT DOCUMENTS

CN 107993242 A 6/2022
JP 2020-056616 A 4/2020

OTHER PUBLICATIONS

Extended European Search Report mailed Aug. 11, 2022, in connection with European Patent Application No. 22162663.3, 11 pgs.

*Primary Examiner* — Son T Le
*Assistant Examiner* — Matthew W. Baca
(74) *Attorney, Agent, or Firm* — Chiesa Shahinian & Giantomasi PC

(57) ABSTRACT

A surveying information management system using an information display terminal and a surveying device configured to measure a point cloud in a three-dimensional space includes: a surveying information acquisition unit configured to acquire, from the surveying device, the surveying information including point cloud data associated with position information; an area setting unit configured to set a display area for the point cloud; a segment setting unit configured to divide the display area into predetermined unit segments; a point cloud amount calculation unit configured to calculate a point cloud amount in a space of each of the unit segments; and a point cloud amount display unit configured to display, on the information display terminal, information according to the point cloud amount calculated for each of the unit segments of the display area by the point cloud amount calculation unit.

16 Claims, 8 Drawing Sheets

(51) Int. Cl.
  *G01V 1/24*     (2006.01)
  *G06T 7/80*     (2017.01)
  *G06V 10/12*    (2022.01)

(52) U.S. Cl.
  CPC .... *G06V 10/12* (2022.01); *G06T 2207/10028* (2013.01)

(58) Field of Classification Search
  CPC ..... G06T 7/11; G06T 7/12; G06T 7/80; G06T 2200/00; G06T 2200/04; G06T 2200/08; G06T 2207/00; G06T 2207/10; G06T 2207/10028; G06T 15/00; G06T 15/06; G06T 17/05; G06T 17/20; G06T 2210/56; G06V 10/12; G06V 10/22; G01S 7/497; G01S 7/51; G01S 17/42; G01S 17/88; G01S 17/89; G01S 17/894; G01S 7/4817; G01C 15/00; G01C 15/002; G06F 16/29
  See application file for complete search history.

(56) References Cited

U.S. PATENT DOCUMENTS

| | | | |
|---|---|---|---|
| 2020/0105043 A1 | 4/2020 | Yasutomi et al. | |
| 2022/0254045 A1* | 8/2022 | Boardman | G06T 17/00 |
| 2023/0047211 A1* | 2/2023 | Abuelwafa | G06T 7/344 |

* cited by examiner

SURVEYING INFORMATION MANAGEMENT SYSTEM, SURVEYING INFORMATION MANAGEMENT METHOD, AND STORAGE MEDIUM STORING SURVEYING INFORMATION MANAGEMENT PROGRAM

CROSS-REFERENCE TO RELATED APPLICATIONS

This application claims priority from Japanese Patent Application No. 2021-045446, filed on Mar. 19, 2021, Japanese Patent Application No. 2021-160901, filed Sep. 30, 2021, and Japanese Patent Application No. 2021-160902 filed Sep. 30, 2021, the disclosures of all are incorporated herein by reference in their entirety.

TECHNICAL FIELD

The present disclosure relates to a surveying information management system, a surveying information management method, and a storage medium storing surveying information management program.

BACKGROUND ART

In recent years, construction utilizing an ICT technology has been performed at a construction site. There has been a demand for efficient and labor-saving work by the ICT technology, including measures against shortage of manpower and the recent epidemic.

As a system for acquiring three-dimensional data on landforms, planimetric features, etc. by means of such an ICT technology, a system has been known, which measures an object from multiple points by means of a ground-based three-dimensional scanner device, acquires three-dimensional point cloud data, and displays such data on a terminal (Japanese Unexamined Patent Publication No. 2020-56616).

SUMMARY

As the method for checking the status of acquisition of such three-dimensional point cloud data, there has been no other choice but to check point cloud data distribution on a planar map or to check the three-dimensional point cloud data by drawing in, for example, a virtual space simulating a three-dimensional space. However, in the method in which the point cloud data distribution on the planar map is checked, it is unclear whether or not a three-dimensionally necessary point cloud amount is satisfied. In the method in which the three-dimensional point cloud data is checked by drawing in the virtual space simulating the three-dimensional space, there is a limitation on spaces to be drawn and checked at once, it is a burden to check all areas.

From the foregoing, it is an objective of the present disclosure to provide a surveying information management system, a surveying information management method, and a storage medium storing a surveying information management program that are capable of efficiently performing scanning at the site and visually checking a scanning status and a data acquisition result in a surveying information management system for measuring point clouds in a three-dimensional space.

In order to achieve the objective, a surveying information management system according to an embodiment of the present disclosure is a surveying information management system for displaying surveying information by using an information display terminal and a surveying device configured to measure a point cloud in a three-dimensional space, and includes: a surveying information acquisition unit configured to acquire, from the surveying device, the surveying information including point cloud data associated with position information; an area setting unit configured to set a display area for the point cloud; a segment setting unit configured to divide the display area into predetermined unit segments; a point cloud amount calculation unit configured to calculate a point cloud amount in a space of each of the unit segments; and a point cloud amount display unit configured to display, on the information display terminal, information according to the point cloud amount calculated for each of the unit segments of the display area by the point cloud amount calculation unit.

In addition, in order to achieve the objective, a surveying information management method according to an embodiment of the present disclosure is a surveying information management method for displaying surveying information by using an information display terminal and a surveying device, the method including: acquiring, from the surveying device, the surveying information including point cloud data associated with position information; setting a display area for a point cloud by an area setting unit; dividing the display area into predetermined unit segments by a segment setting unit; calculating a point cloud amount in a space of each of the unit segments by a point cloud amount calculation unit, and displaying, on the information display terminal by a point cloud amount display unit, information according to the point cloud amount calculated for each of the unit segments of the display area in the calculating of the point cloud amount.

In addition, in order to achieve the objective, a storage medium storing a surveying information management program according to an embodiment of the present disclosure is a surveying information management program for displaying surveying information by using an information display terminal and a surveying device, the storage medium causing a computer to execute: acquiring, from the surveying device, the surveying information including point cloud data associated with position information; setting a display area for a point cloud by an area setting unit; dividing the display area into predetermined unit segments by a segment setting unit; calculating a point cloud amount in a space of each of the unit segments by a point cloud amount calculation unit, and displaying, on the information display terminal by a point cloud amount display unit, information according to the point cloud amount calculated for each of the unit segments of the display area in the calculating of the point cloud amount.

According to the embodiments of the present disclosure, scanning can be efficiently performed at the site, and a scanning status and a data acquisition result can be visually checked.

DETAILED DESCRIPTION

Outline

For example, at an outdoor site for civil engineering work etc., an operation of sequentially acquiring three-dimensional point cloud data (hereinafter also referred to as "point cloud data") by using a surveying device such as a three-dimensional scanner and sequentially checking a status at the site such as a status before the start of the work or a status at the start of the work has been performed. Such a status at the site is provided in a predetermined format, e.g., a report format, to a facility requiring the report as a deliverable. Typically, in order to acquire a point cloud at the site, an operation of placing the surveying device at a position and acquiring a point cloud around the position is performed multiple times for different locations. Alternatively, a point cloud may be acquired while an moving object on which a three-dimensional scanner or the like has been mounted is moving in a management area.

The status of acquisition of the three-dimensional point cloud data is checked using an information display terminal allowing an operator to view the data at hand, such as a smartphone, a tablet, or a PC. In this case, in the method of displaying a point cloud amount by drawing a point cloud in a virtual space simulating a three-dimensional space, there is a limitation on the space to be drawn and checked at once, it takes time to check all areas, and these areas cannot be checked at sight.

In order for the operator to end the operation of checking a point cloud acquisition status at the site, it is required that all areas targeted for management satisfy a necessary point cloud amount, but it is also required that such satisfaction can be quantitatively checked.

As another problem, it is not preferred that all the acquired three-dimensional point cloud data is displayed. An area to be managed is set for construction. Displaying and counting of point clouds in areas outside a management area waste computational resources, and cause a great load.

As measures against aspects of the above-described events, inventors of the present disclosure have conceived of the concept of management of a point cloud amount, and have arrived at the following idea. The point cloud amount management is performed for a predetermined management area so that scanning can be efficiently performed at the site, a scanning status can be visually predicted, and a data acquisition result can be visually checked, whereby the work can be efficiently performed.

Figure 1:
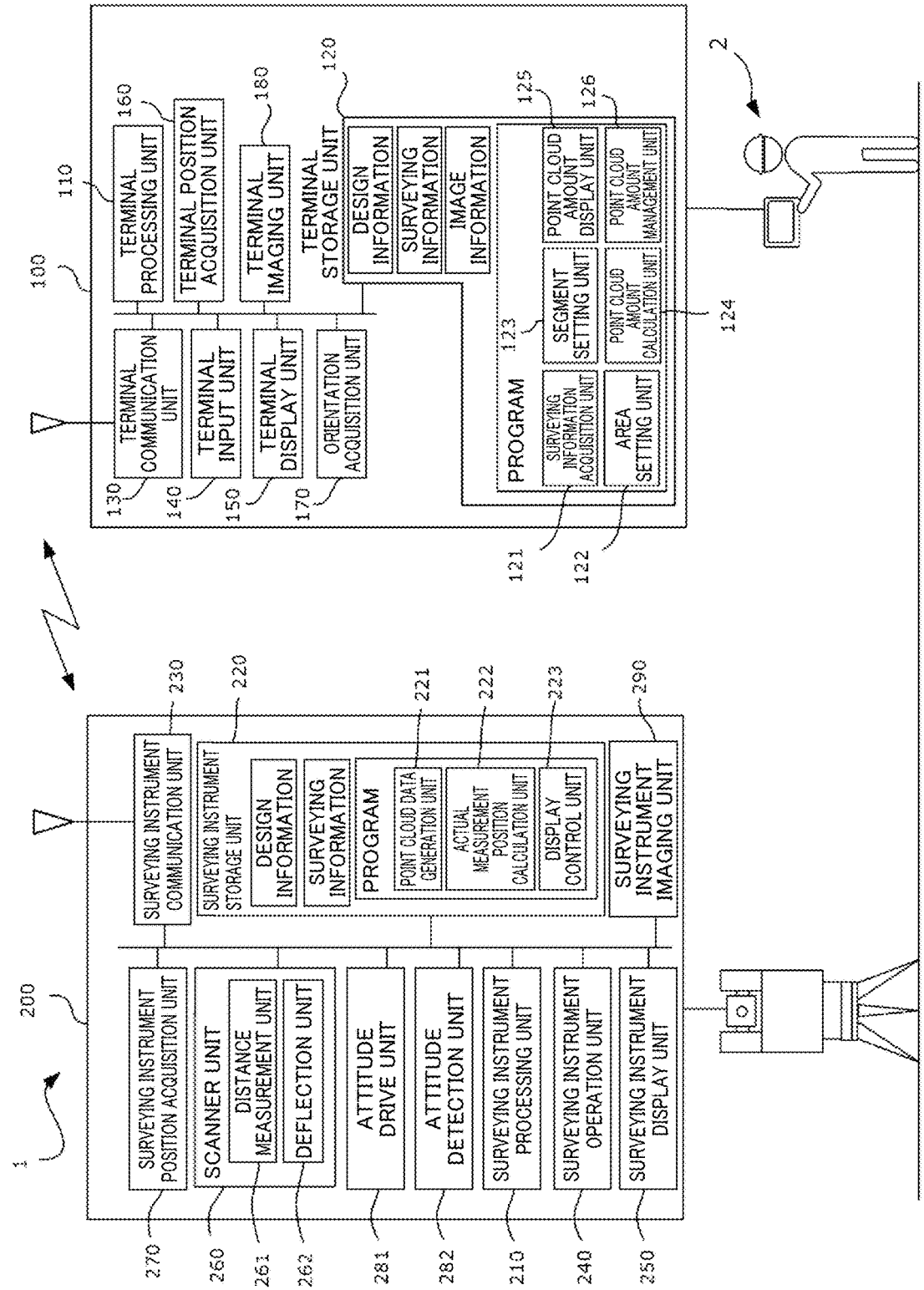
FIG. 1 is a system configuration diagram illustrating a configuration of a surveying information management system according to an embodiment of the present disclosure.

An embodiment of the present disclosure will be described below with reference to the drawings. FIG. 1 is a system configuration diagram illustrating a configuration of a surveying information management system according to the embodiment of the present disclosure.

Configuration of System

A surveying information management system 1 includes an information display terminal 100 used by an operator 2 and a surveying device 200. The operator 2 uses the surveying information management system 1 having these components to acquire three-dimensional point cloud data and check the data in an outdoor place such as a civil engineering work site, for example.

An example of the surveying device 200 for measuring and acquiring the three-dimensional point cloud data is a three-dimensional scanner device, more specifically a three-dimensional laser scanner device. The surveying device 200 includes a surveying instrument storage unit 220, a scanner unit 260, an attitude drive unit 281, an attitude detection unit 282, a surveying instrument display unit 250, a surveying instrument operation unit 240, a surveying instrument communication unit 230, a surveying instrument processing unit 210, a surveying instrument position acquisition unit 270, and a surveying instrument imaging unit 290, and these components are electrically connected to each other.

The surveying instrument storage unit 220 is a storage device using a memory or a magnetic disk, and stores various pieces of design information etc. at the site. The design information includes, for example, building information modeling (BIM). Note that the design information is not limited to the BIM and may be, for example, three-dimensional CAD data. Further, the design information may be an image drawing which is an image file with a scale.

The scanner unit 260 is, for example, a laser scanner, and has a distance measurement unit 261 and a deflection unit 262. The distance measurement unit 261 has the function of emitting laser light as distance measurement light and receiving the reflected light to measure a distance and an angle.

The attitude drive unit 281 is an actuator that rotatably drives the scanner unit 260 horizontally and vertically. The orientation of the scanner unit 260 can be changed by drive of the attitude drive unit 281.

The attitude detection unit 282 is a rotation angle sensor (an encoder) driven by the attitude drive unit 281 and capable of detecting a horizontal angle and a vertical angle. Further, the attitude detection unit 282 may have an inclination measuring instrument (a tilt sensor) that detects the inclination angle of the surveying device 200. The attitude detection section 282 can detect an orientation of the scanner unit 260.

The surveying instrument display unit 250 is a display capable of displaying various pieces of information such as a virtual space based on design information stored in the surveying instrument storage unit 220, a measurement result obtained by the scanner unit 260, and an analysis result obtained by the surveying instrument processing unit 210.

The surveying instrument operation unit 240 is a unit allowing settings and operations such as measurement by the scanner unit 260 and drive of the attitude drive unit 281. The surveying instrument operation unit 240 may be a physical button or a touch screen which is integral with the surveying instrument display unit 250, for example.

The surveying instrument communication unit 230 is a communication instrument capable of communicating with at least various information terminals. For example, the surveying instrument communication unit 230 may be a communication instrument connectable to a network such as the Internet or a communication instrument connected to the information display terminal 100 in a wireless or wired manner to communicate with the information display terminal 100.

The surveying instrument position acquisition unit 270 has the function of acquiring the position of the surveying device 200 when the surveying device 200 is stopped or while the surveying device 200 is moving. Specifically, the surveying instrument position acquisition unit 270 has, for example, the function of acquiring the position of the surveying device 200 through installation of the surveying device 200 at an instrument point, and surveys a target, such as a retroreflective prism, installed at a known position so that the position of the surveying device 200 itself can be acquired. Alternatively, the surveying instrument position acquisition unit 270 may be a global navigation satellite system (GNSS) receiving device. The position information acquired by the surveying instrument position acquisition unit 270 is position information on the local coordinates of the surveying device 200. Here, the local coordinates are coordinates based on design information on a site to be surveyed using point clouds.

The surveying instrument imaging unit 290 is, for example, a camera that captures an image. The image captured by the surveying instrument imaging unit 290 may be a moving image or a still image, and the surveying instrument imaging unit 290 is preferably a camera capable of capturing a so-called panoramic image that is long in the horizontal direction. Specifically, the surveying instrument imaging unit 290 may be an omnidirectional camera capable of capturing an image of 360 degrees in the horizontal direction, or may capture a panoramic image by rotating a camera having a predetermined angle of view by 360 degrees. The image captured by the surveying instrument imaging unit 290 can be transmitted as image information to the information display terminal 100 via the surveying instrument communication unit 230.

The surveying instrument processing unit 210 is a unit serving as a central processing unit that performs various controls in the surveying device 200, and as functions implemented by programs stored in the surveying instrument storage unit 220, has a point cloud data generation unit 221, an actual measurement position calculation unit 222, and a display control unit 223.

The display control unit 223 has the function of generating the display of a three-dimensional virtual space at a construction site based on the design information stored in the surveying instrument storage unit 220 and displaying point cloud data displayed on the virtual space, an actual measurement position calculated by the actual measurement position calculation unit 222, and the like on the surveying instrument display unit 250.

The point cloud data generation unit 221 has the function of generating the three-dimensional point cloud data from a distance from each distance measurement point (each point cloud) measured by the scanner unit 260 and the horizontal and vertical angles detected by the attitude detection unit 282.

The actual measurement position calculation unit 222 has the function of calculating the position of actual measurement of the three-dimensional point cloud data generated by the point cloud data generation unit 221.

The surveying device 200 may have other surveying functions. For example, the surveying device 200 may have a three-dimensional scanner function at a total station (TS). Alternatively, the surveying device 200 may have a movement function of autonomously traveling in a predetermined route, or may be configured so that a movement path can be controlled by remote control. Examples of a moving object in the case of the surveying device 200 having the movement function include a vehicle, a robot, and an unmanned aerial vehicle (UAV). The vehicle also includes a heavy machine that travels in the site.

Examples of the information display terminal 100 include a smartphone, a feature phone, a tablet, a handheld computer device (e.g., a personal digital assistant (PDA)), and a wearable terminal (e.g., a glasses-type device or a watch-type device). A general-purpose terminal is, with application software installed, usable as an information display terminal of this embodiment. Such an information display terminal 100 includes a terminal display unit 150, and is portable and can be easily carried to the construction site. The terminal display unit 150 may be viewed hands-free or by holding it with one hand. The terminal display unit 150 may also include an internal power supply such as a battery and may thus be operated for a certain period of time without requiring an external power supply.

The information display terminal 100 includes a terminal communication unit 130, a terminal storage unit 120, a terminal processing unit 110, a terminal input unit 140, the terminal display unit 150, a terminal position acquisition unit 160, an orientation acquisition unit 170 (a terminal orientation acquisition unit), and a terminal imaging unit 180.

Although not shown, the terminal processing unit 110 executes the functions and/or methods implemented by codes or commands included in the programs stored in the terminal storage unit 120. Examples of the terminal processing unit 110 include a central processing unit (CPU), a microprocessor unit (MPU), a graphics processing unit (GPU), a microprocessor, a processor core, a multiprocessor, an application specific integrated circuit (ASIC), and a field-programmable gate array (FPGA). The terminal processing unit 110 may include a logic circuit or a dedicated circuit formed in an integrated circuit, for example, to execute the processing disclosed in the embodiment. These circuits may be implemented as one or more integrated circuits. A single integrated circuit may execute the multiple types of processing described in the embodiment. Although not shown, the terminal processing unit 110 may include a main storage unit that temporarily stores the programs read out from the terminal storage unit 120 and provides a workspace to the terminal processing unit 110.

The terminal communication unit 130 is communicative with the surveying instrument communication unit 230 of the surveying device 200, and can receive the three-dimensional point cloud data measured and calculated by the surveying device 200, the position information on the surveying device 200, and the image information captured by the surveying instrument imaging unit 290. The actual measurement position information for the three-dimensional point cloud data may be computed by the surveying device 200 or the information display terminal 100. The communications may be established wired or wirelessly. As long as mutual communications are established, any communication protocol may be used.

The terminal input unit 140 is any one or a combination of all types of devices capable of receiving inputs from a user, i.e., the operator 2, and transmits the information related to the inputs to the terminal processing unit 110. Examples of terminal input unit 140 include, in addition to a hardware input means such as buttons, a software input means displayed on a display unit such as a touch panel, and an audio input means such as a remote controller or a microphone.

The terminal display unit 150 is any one or a combination of all types of devices capable of displaying a screen. Examples of terminal display unit 150 include a flat display such as a liquid crystal display or an organic light-emitting diode (OLED) display, a curved display, a folding screen on a foldable terminal, a head-mounted display, and a device displayable through projection on an object using a small projector.

The terminal position acquisition unit 160 is, for example, a global navigation satellite System (GNSS) receiving device, and has the function of acquiring the position of the information display terminal 100 when the information display terminal 100 is stopped or while the information display terminal 100 is moving. The position information acquired by the terminal position acquisition unit 160 is the global coordinates of the information display terminal 100.

The terminal imaging unit 180 is, for example, a camera that captures an image, is provided on the back side of the terminal display unit 150 in the information display terminal 100, and can display the captured image on the terminal display unit 150. The image captured by the terminal imaging unit 180 may be a moving image or a still image.

The orientation acquisition unit 170 is, for example, an electronic compass, and has the function of detecting geomagnetism by a magnetic sensor and calculating the orientation of the information display terminal 100. With this configuration, the orientation acquisition unit 170 can acquire the orientation of the terminal imaging unit 180 in an imaging direction, i.e., an orientation in which the operator 2 views through the terminal display unit 150.

The terminal storage unit 120 functions to store various necessary programs or various data. In addition, the terminal storage unit 120 can store surveying information (the three-dimensional point cloud data, the position information on the surveying device 200) received by the terminal communication unit 130. For example, the terminal storage unit 120 stores the design information including the information (e.g., the altitude) on the ground used at a construction site or the design information on a slope. The terminal storage unit 120 is any of various storage media such as a hard disk drive (HDD), a solid state drive (SSD), and a flash memory.

The design information includes design drawings necessary for construction works. Examples of the construction works include constructions of structures such as buildings, roads, railroads, tunnels, bridges, ditches, waterways, and rivers. The design drawings include plan views, longitudinal sectional views, and transverse sectional views; and the linear data, the point data, and the positions, coordinates, and altitudes of the points and line segments included in the views.

The terminal storage unit 120 stores, as application software programs, a surveying information acquisition unit 121, an area setting unit 122, a segment setting unit 123, a point cloud amount calculation unit 124, a point cloud amount display unit 125, and a point cloud amount management unit 126 that fulfil various functions. The terminal storage unit 120 may store the programs for implementing the functions of the point cloud data generation unit 221 and the actual measurement position calculation unit 222, stored in the surveying device 200, and the functions may be implemented by execution of these programs in the terminal processing unit 110.

The surveying information acquisition unit 121 has the function of acquiring, from the surveying device 200, the surveying information including the point cloud data associated with the position information. More specifically, the three-dimensional point cloud data is generated in the point cloud data generation unit 221 by measurement using the scanner unit 260 of the surveying device 200. In the actual measurement position calculation unit 222, the point cloud position information is added to and associated with each point cloud of the three-dimensional point cloud data. The point cloud data associated with the position information is acquired through communication between the surveying instrument communication unit 230 and the terminal communication unit 130.

The area setting unit 122 has the function of setting a display area for the point cloud. More specifically, a predetermined area on the map (the local coordinates) of the construction site is set as the display area where the point cloud amount needs to be managed. The area may be set in such a manner that the operator 2 makes an input to specify the display area for the point cloud by using the terminal input unit 140 of the information display terminal 100. Alternatively, the area may be instructed by using, e.g., software for managing the site in a predetermined information processing management server through access of the information display terminal 100 to the information processing management server with the terminal communication unit 130. The software can be installed and executed on the predetermined information processing management server. Alternatively, the area may be set in such a manner that the area setting unit 122 reads management area information included in the design information and the like stored in the terminal storage unit 120. The display area can be, for example, specified by a boundary surrounding the display area and separating between the inside and outside of the display area on the map. Further, the display area is set on the map, and is provided with the position information on the map or the design drawing so that the display area can be displayed in association with the map or the design drawing.

The segment setting unit 123 has the function of dividing the display area into predetermined unit segments. More specifically, the display area set by the area setting unit 122 is divided into a plurality of unit segment groups divided by predetermined unit area segments. A most typical example is, but not limited to, division into square segments with the same area, i.e., grid units. In addition to the square shape, all shapes in which the display area can be divided into a plurality of continuous unit segments with no clearance, such as a hexagonal shape or a triangular shape, can be employed. The size of each unit segment can also be freely set. Each unit segment crossing the boundary may include one outside the boundary and one in a partially missing shape so as not to be outside the boundary. The position information is provided to each unit segment by using the position information, which is provided to the display area, on the map.

The point cloud amount calculation unit 124 has the function of calculating the point cloud amount included in each space as the unit segment. More specifically, the point cloud amount calculation unit 124 compares the position information on each unit segment with the position information associated with the acquired three-dimensional point cloud data so that the point cloud amount included in the space of each unit segment can be calculated. The "point cloud amount" is a quantitative indicator regarding a point cloud, including the number of point clouds, the number of point clouds per unit area, the number of point clouds per unit volume, the average of altitude values of point clouds included in a unit segment, and other statistics. The point cloud amount is not limited merely to the number of point clouds.

Only point clouds under predetermined conditions may be targeted for the calculation of the point cloud amount. Specifically, only point clouds within a predetermined distance from the surveying device 200 may be targeted for the calculation, and for example, only point clouds within a 30-meter radius from the surveying device 200 may be provided for calculation. Here, the predetermined distance is set using, for example, a predetermined testing method by calculating a measurement distance that can be used by the surveying device 200 at the site. The predetermined testing method includes, for example, an accuracy checking test in which a distance is compared between two points obtained from a measurement result of a distance between two or more known points by a total station or the like and a measurement result obtained using the surveying device 200 and whether or not a difference therebetween falls within a predetermined range is checked. The measurement accuracy of the surveying device 200 generally decreases as the incident angle of laser light on a road surface decreases. Only point clouds for a predetermined incident angle or greater may thus be used for calculation of the point cloud amount.

In addition, the point cloud amount calculation unit 124 may have the function of calculating the point cloud amount in a space within a predetermined altitude range for each unit segment. More specifically, the upper and lower limits of the altitude value are set, and the point cloud amount in a space of each unit segment within such an altitude range is calculated.

In addition, the point cloud amount calculation unit 124 may have the function of calculating the indicator (e.g., a sufficiency rate) regarding the sufficiency for a necessary point cloud amount in the display area or the unit segment. More specifically, the point cloud amount calculation unit 124 can read the necessary point cloud amount per unit segment from the design information in the terminal storage unit 120, and compare the necessary point cloud amount with an actually calculated point cloud amount to calculate the indicator regarding the sufficiency for the necessary point cloud amount. The indicator of the sufficiency for the necessary point cloud amount may be a sufficiency rate (e.g., "80% sufficient") with respect to the necessary point cloud amount or an insufficiency rate (e.g., "20% insufficient") with respect to the necessary point cloud amount. The sufficiency rate may be indicated by numbers, by levels such as high, medium, and low, or by only sufficiency or insufficiency for a predetermined threshold provided. Alternatively, the sufficiency rate may be calculated for all unit segments, and the sufficiency rate of the entire display area may be calculated. The sufficiency rate of the entire display area may be, for example, the average of the sufficiency rates of all unit segments, or may be obtained in such a manner that the number of unit segments satisfying the necessary sufficiency rate or the like is divided by the number of all unit segments.

In addition, the point cloud amount calculation unit 124 may have the function of calculating, based on the position of each acquired point cloud, predicted values of an area and a point cloud amount that can be acquired when a point cloud is surveyed at such a position. More specifically, in a case where the surveying device 200 is placed at a certain location within the display area and point clouds are acquired from the surveying device 200, the position information on the surveying device 200 is acquired as described above, and an estimation of a three-dimensional point cloud data amount, which can be acquired from around the surveying device 200 is calculated, for example. Regarding the point cloud area and amount which can be acquired, information regarding the performance of the surveying device 200 is stored in advance in a unit storage, and around the installation position of the surveying device 200, the area and the number of point clouds to be acquired can be calculated based on the performance of the device.

In addition, the point cloud amount calculation unit 124 may have the function of calculating, when the predicted values are calculated and there is an overlapping segment already having a point cloud amount as an existing value calculated based on the surveying information within the predicted area, an addition value of the calculated point cloud amount and the predicated value of the point cloud amount for the overlapping segment. More specifically, the surveying information on the already-measured three-dimensional point cloud data is, as the existing value, invoked from the terminal storage unit 120, and when the predicted value calculated as described above includes an area, i.e., a unit segment, overlapping with the existing value in terms of an observation area, the existing value and the predicted value for such a unit segment are added up so that an addition value indicating an estimation on the degree of rise in the point cloud amount by surveying can be calculated.

For calculation of the addition value for the unit segment overlapping in terms of the observation area as described above, the point cloud amount calculation unit 124 may calculate not only the addition value of the existing value and the predicted value but also an addition value of already-measured existing values.

The point cloud amount display unit 125 has the function of displaying each segment of the display area on the information display terminal 100 according to the calculated point cloud amount for unit segment. More specifically, in a case where the point cloud amount is the number of point clouds, the number of point clouds per unit area, or the number of point clouds per unit volume, the segments can be displayed differently depending on the level of the point cloud amount so that the level of the point cloud amount can be grasped according to the calculated point cloud amount, the predicted value of the point cloud amount, and the addition value obtained by addition of the predicated value to the calculated point cloud amount as the existing value. A most typical example is, but not limited to, color-coded displaying. For example, the unit segment with a high point cloud amount can be displayed in red, the unit segment with a low point cloud amount in blue, yellow in between in a color distribution. In a case where the point cloud amount is a point cloud altitude value, the average of the altitude values of point clouds included in the unit segment, or the statistics thereof, the point cloud amount can be displayed in such color distribution that a unit segment with a high altitude is colored red, a unit segment with a low altitude is colored blue, and a unit segment with an altitude therebetween is colored yellow.

In addition, the point cloud amount display unit 125 may have the function of displaying the point cloud amount in a predetermined altitude range in each unit segment, an indicator regarding the sufficiency for the necessary point cloud amount in the display area or the unit segment, and the point cloud amount according to the predicted value for each segment, displaying the point cloud amount according to the addition value obtained by addition of the predicted value to the calculated existing value, and displaying the point cloud amount according to the addition value of the existing values. More specifically, the way to display the indicator so that the point cloud amount can be grasped, such as the above-described color-coded displaying, can be applied to displaying the point cloud amount in the predetermined altitude range in each unit segment, the indicator regarding the sufficiency for the necessary point cloud amount in the display area or the unit segment, and the point cloud amount according to the predicted value for each segment and displaying the point cloud amount according to the addition value obtained by addition of the predicted value to the calculated existing value.

In addition, the point cloud amount display unit 125 adjust the position information acquired by the terminal position acquisition unit 160 and the local coordinates including the display area for the point cloud to each other so that the position of the information display terminal 100 on the local coordinates can be displayed on the terminal display unit 150. For example, as the (coordinate conversion) technique of adjusting the global coordinates acquired by the terminal position acquisition unit 160 to the local coordinates of the site targeted for surveying to each other, the operator 2 moves the information display terminal 100 to a known point on the local coordinates and performs the operation for adjusting the coordinates, and accordingly, the point cloud amount display unit 125 performs adjustment to the local coordinates according to an association between the known point on the local coordinates and the position information acquired by the terminal position acquisition unit 160. As the known point, a reference point or a point obtained by surveying with a total station or a global navigation satellite system (GSNN) and including the position information on the global coordinates can be used.

In addition, the point cloud amount display unit 125 superimposes the unit segments and the point cloud amounts on the image captured by the terminal imaging unit 180 in the three-dimensional space according to the position of the information display terminal 100 on the local coordinates and the imaging direction of the terminal imaging unit 180 such that so-called augmented reality (AR) displaying is allowed. The information displayed so as to be superimposed on the image captured by the terminal imaging unit 180 is not limited to the unit segment and the point cloud amount. The indicator regarding the sufficiency for the necessary point cloud amount calculated by the point cloud amount calculation unit 124, the predicted values of the area and the point cloud amount which can be acquired in the case of surveying a point cloud, and the like may be displayed for each unit segment or the current installation position of the surveying device 200. Alternatively, the installation position of the surveying device 200 at the time of previous surveying, the position of the known point, the position of the moving object at a known position, and the like may be displayed. The installation position of the surveying device 200, the position of the known point, the position of the moving object, and the like are preferably displayed using icons so that the operator 2 can easily identify these positions.

The information display terminal 100 can provide, via the terminal input unit 140, a point cloud measurement instruction to the surveying device 200 whose position is displayed so as to be superimposed on the image. Specifically, the operator 2 specifies, via the terminal input unit 140 of the information display terminal 100, the surveying device 200 displayed on the terminal display unit 150, sets the conditions for surveying point clouds, and executes surveying. As the conditions for surveying the point clouds, the ranges of horizontal and vertical angles and a measurement distance for defining an area where scanning is to be performed are set, for example. At this point, the point cloud amount display unit 125 can display, on the terminal display unit 150, the image captured by the surveying instrument imaging unit 290 of the surveying device 200 targeted for operation. The operator 2 can specify the orientation of the surveying device 200 from the image captured by the surveying instrument imaging unit 290, thereby setting the conditions for surveying.

The surveying device 200 may measure a point cloud in an area limited according to the point cloud surveying conditions set by the operator 2 as described above, or may measure a point cloud with a limitation to the display area for the point cloud set by the area setting unit 122. Specifically, the point cloud amount display unit 125 calculates and estimates an area which can be measured by the surveying device 200 from the orientation of the surveying device 200 based on the information on the current position of the surveying device 200 and the image information captured by the surveying instrument imaging unit 290, and sends an instruction to the surveying device 200 to perform measurement for an area other than that outside the display area set by the area setting unit 122 of the information display terminal 100.

The point cloud amount management unit 126 has the function of displaying, when there is a segment whose point cloud amount does not reach the predetermined necessary point cloud amount in the display area, information indicating the insufficiency of the point cloud amount on the information display terminal 100. More specifically, as in the above-described example, the predetermined threshold for the point cloud amount in the terminal storage unit 120 is used to determine whether the point cloud amount of each unit segment is sufficient or insufficient. The indication of the point cloud amount being insufficient in the unit segment is, as an alert, displayed on the terminal display unit 150 of the information display terminal 100 so that the operator 2 can recognize such an alert. In a case where the point cloud amount is the point cloud altitude value, the average of the altitude values, or the statistics thereof, it may be, for each unit segment, determined whether the point cloud amount is higher or lower than the reference value by comparison with other reference three-dimensional data such as a design altitude value in the design information targeted for comparison. The indication of the point cloud amount of the unit segment falling outside the reference may be similarly displayed as an alert so that the operator 2 can recognize such an alert.

In addition, the point cloud amount management unit 126 has the function of calculating the accuracy of installation of the surveying device 200 at the instrument point from the point cloud data measured from a plurality of installation positions and displaying information regarding the accuracy of installation at the instrument point on the information display terminal 100. More specifically, in a unit segment including multiple pieces of point cloud data measured from different directions, a comparative indicator such as an average altitude or a median is calculated for every multiple pieces of point cloud data, and the accuracy of installation at the instrument point is calculated based on a difference between the comparative indicators.

For example, in a case where there is point cloud data (first point cloud data Da, second point cloud data Db, third point cloud data Dc) measured from at least three installation positions within the same unit segment, a difference (Ea−Eb, Ea−Ec, Eb−Ec) in an average altitude (Ea, Eb, Ec) calculated from each piece of point cloud data is calculated as the accuracy of installation at the instrument point. If this difference is less than a predetermined value, the point cloud amount management unit 126 determines that there is no problem about installation at the instrument point. On the other hand, if any two of the differences are equal to or greater than the predetermined value, it is determined that there is a problem about installation at the instrument point. For example, in a case where the difference Eb−Ec not relating to the first point cloud data Da is less than the predetermined value while any of the difference Ea−Eb and the difference Ea−Ec relating to the first point cloud data Da is equal to or greater than the predetermined value, it is determined that there is a problem about installation at a point at which the first point cloud data Da has been measured.

Then, the point cloud amount management unit 126 displays, as the information regarding the accuracy of installation at the instrument point, the above-described difference between the comparative indicators for each unit segment on the information display terminal 100. For example, a unit segment that the difference between the comparative indicators is less than a predetermined value may be displayed blue, a unit segment that the difference is equal to or greater than the predetermined value may be displayed red, and a case where there is no point cloud data measured from at least three points in the same unit segment may be displayed white. Alternatively, the numerical value of the difference between the comparative indicators may be displayed in each unit segment. The accuracy of installation at the instrument point may be displayed together with the above-described point cloud amount, or may be displayed on another screen by switching. For the unit segment determined as having the problem, details such as the surveying position of the surveying device 200 having measured the point cloud data, the method for installing such a surveying device 200, and the like may be checked again, and an alert for requesting re-measurement may be displayed. Calculation is not necessarily performed for each overlapping unit segment and the accuracy of installation at the instrument point may be calculated and displayed for the entirety of the area having the overlapping point cloud data, such as indication of the percentage of unit segments that the difference from the comparative indicator of other point cloud data is equal to or greater than the predetermined value.

Flow of Processing

Figure 2:
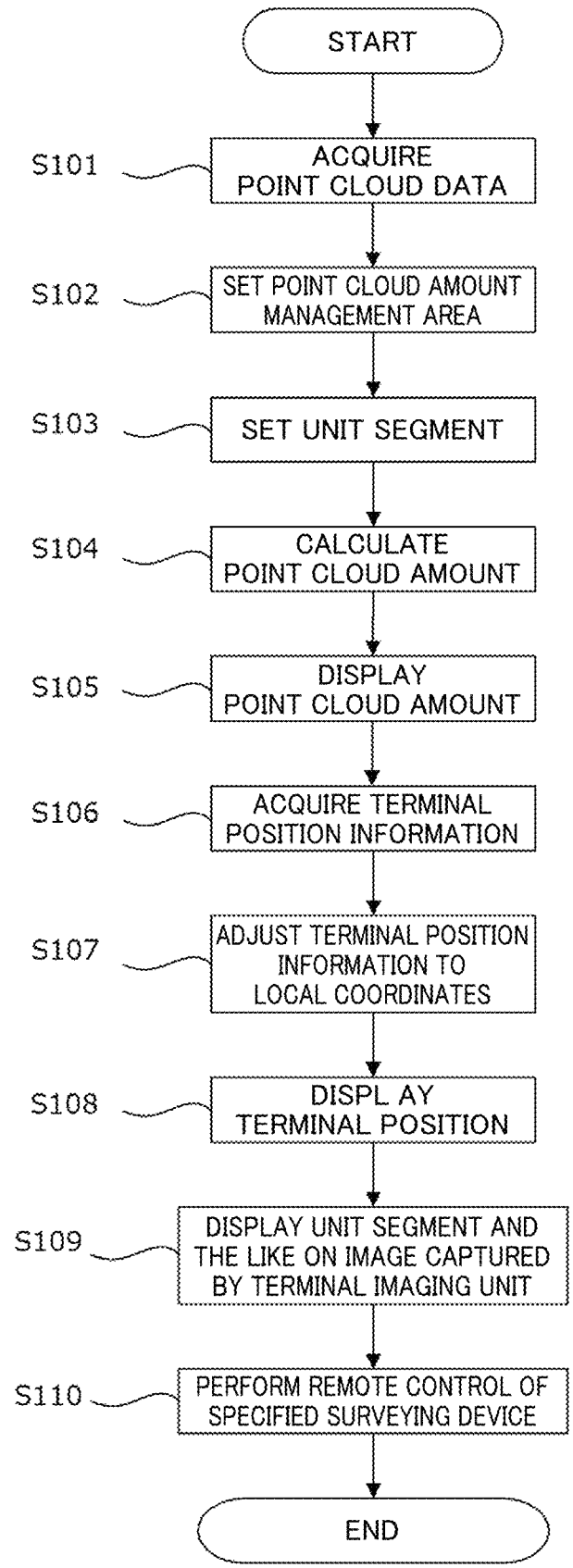
FIG. 2 is a flowchart illustrating the flow of processing.

FIG. 2 is a flowchart illustrating a surveying information management method using the surveying information management system of the embodiment of the present disclosure and the flow of a surveying information management program.

First, in Step S101, the surveying information acquisition unit 121 acquires the surveying information including the point cloud data associated with the position information from the surveying device 200. The point cloud data may be acquired after area setting in Step S102 and segment setting in Step S103 as described later.

Figure 3:
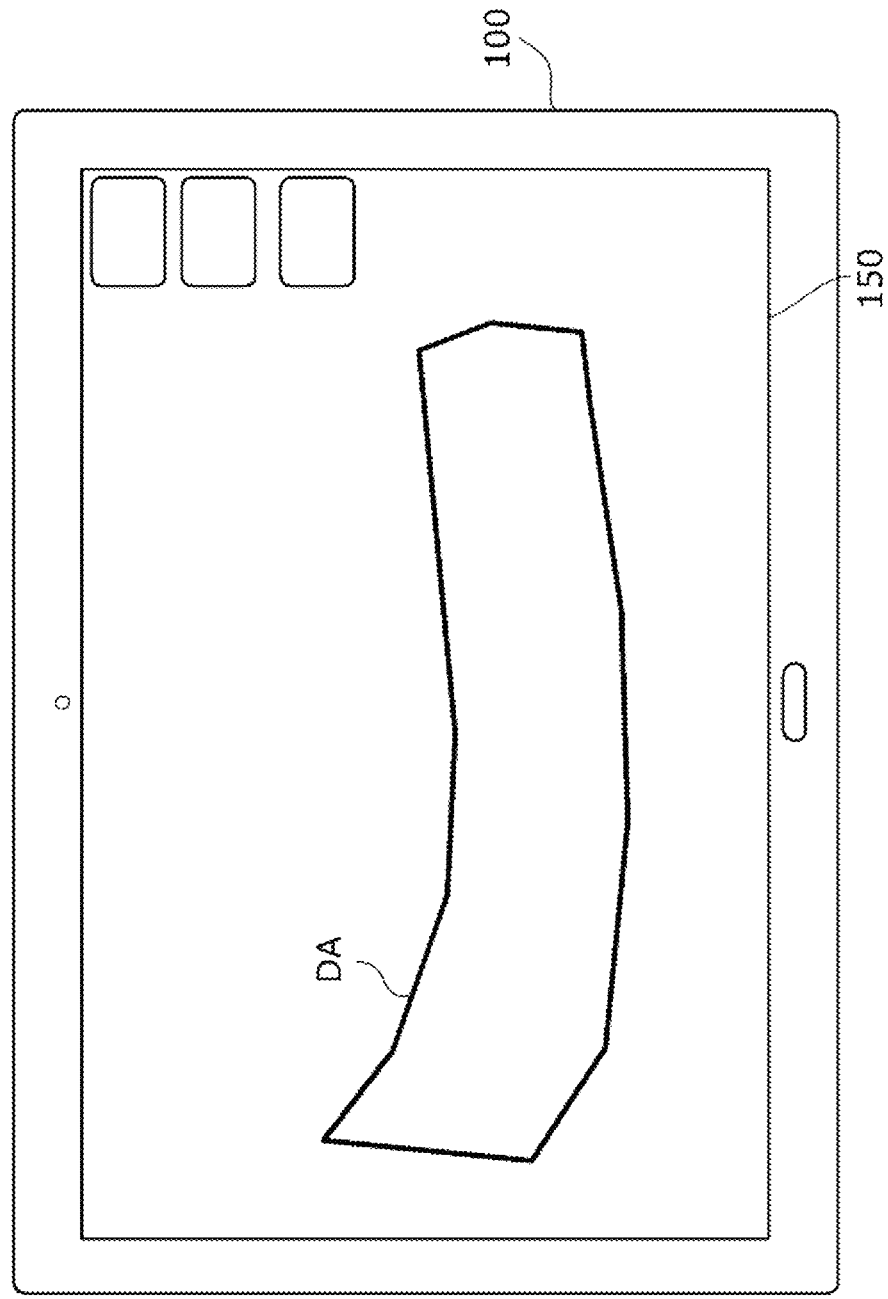
FIG. 3 shows an example of a screen displayed on an information display terminal.

In Step S102, the area setting unit 122 sets a display area for the point cloud. FIG. 3 shows an example of a screen displayed on the terminal display unit 150 of the information display terminal 100. In the example shown in FIG. 3, the information display terminal 100 is a so-called tablet terminal, the terminal display unit 150 is, for example, a liquid crystal display or an OLED display, and the terminal input unit 140 is an input unit implemented by the touch panel functions of these displays. In FIG. 3, a map indication (not shown) such as a map or an aerial photograph is displayed on the terminal display unit 150. Referring to the map indication, the operator 2 inputs the display area onto the map indication, and the area setting unit 122 sets the display area based on such an input. The input may be made by various methods such as freely drawing a boundary with a finger or a touch pen, and setting two points on a diagonal line to set a rectangular area. In FIG. 3, the display area DA is displayed on the map indication. At this point, the display area DA is provided with the position information.

Figure 4:
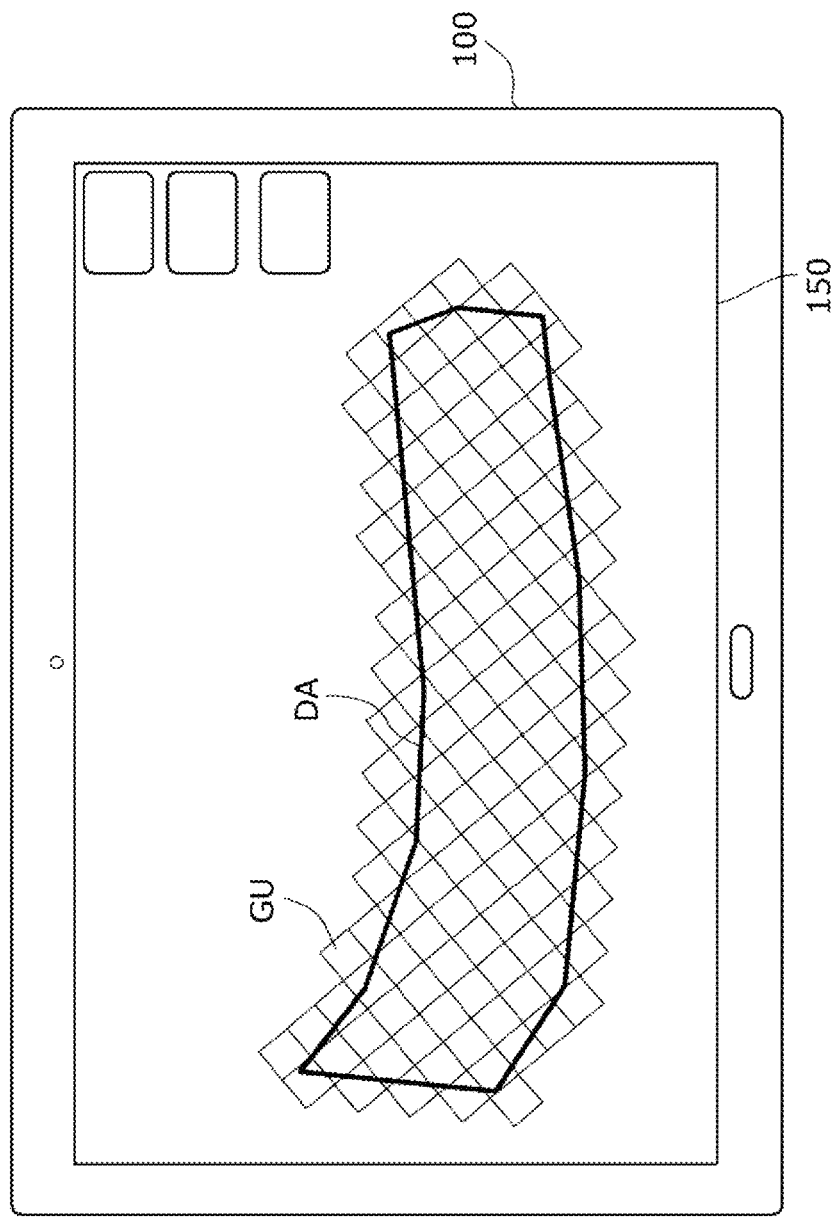
FIG. 4 shows another example of the screen displayed on the information display terminal.

In Step S103, the segment setting unit 123 divides the display area into predetermined unit segments. FIG. 4 shows an example of the screen displayed on the terminal display unit 150 of the information display terminal 100. In the example shown in FIG. 4, the display area DA is divided into a plurality of unit segments GU. For the sake of simplicity in illustration, unit segments are exaggeratedly oversized in FIG. 4, but it is actually easier to understand if the unit segments are expressed in high-definition in units of one dot or one pixel. Moreover, in FIG. 4, in a region where the boundary of the display area DA cross the unit segments, the unit segments outside the boundary are displayed, but are not necessarily displayed. The acquired three-dimensional point cloud data can be managed regardless of whether or not the unit segments are within the display area.

In Step S104, the point cloud amount calculation unit 124 calculates the point cloud amount in the space for each unit segment. The point cloud amount is calculated for all unit segments described above.

Figure 5:
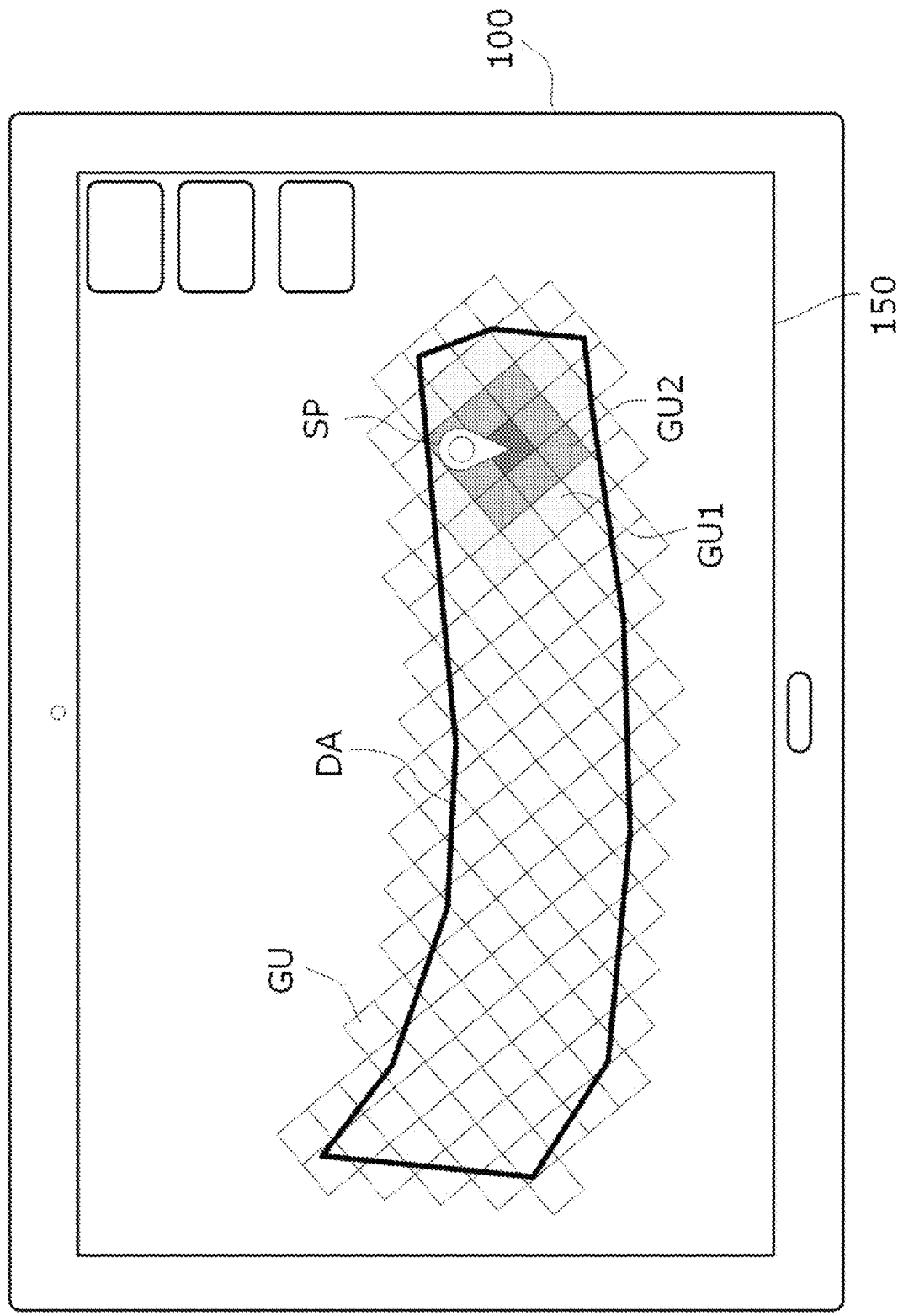
FIG. 5 shows another example of the screen displayed on the information display terminal.

In Step S105, the point cloud amount display unit 125 displays each segment of the display area on the information display terminal 100 according to the calculated point cloud amount for unit segment. FIG. 5 shows another example of the screen displayed on the terminal display unit 150 of the information display terminal 100. In the example shown in FIG. 5, the surveying device 200 is placed in a unit segment at a position SP, and the point cloud amount for the position SP has been already acquired. Regarding the point cloud amount according to the three-dimensional point cloud data acquired at the surveying device position SP, the unit segments around the position SP are displayed in shades of colors according to the point cloud amount. No point clouds are actually acquired for the installation position of the surveying device 200 and the position right below the surveying device 200 and the point cloud amount is small at these positions, but in FIG. 7, the point cloud amount is displayed higher toward the surveying device position SP for the sake of simplicity in illustration. For example, a unit segment GU2 is displayed in a darker color than that of a unit segment GU1, so that it can be intuitively understood that the acquired point cloud amount is higher in the unit segment GU2. Similarly, the difference between the comparative indicators such as the altitudes based on the point cloud data from the plural installation positions can also be displayed as the information regarding the accuracy of installation at the instrument point. In this manner, the point cloud acquisition status and the difference between the comparative indicators can be simply displayed according to a color, and the display area can be viewed at once. The operator 2 thus can easily check whether or not a necessary number of pieces of data such as the point cloud amount and the accuracy of installation at the instrument point is, as the three-dimensional point cloud data, acquired with a necessary accuracy for each segment of the display area where the point cloud amount needs to be managed. Consequently, scanning can be efficiently performed at the site, and the status of scanning and the status of data acquisition can be visually checked.

Figure 6:
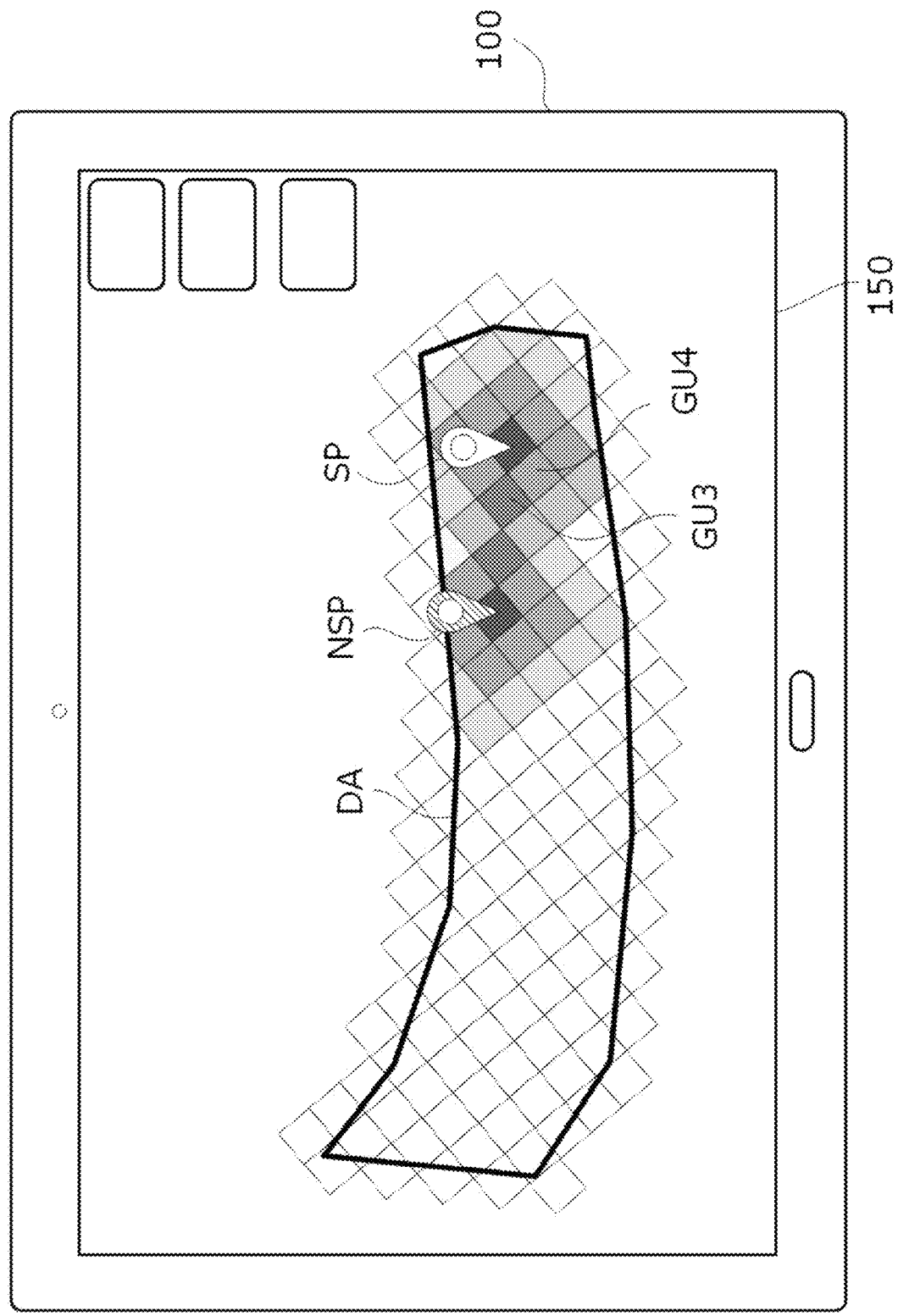
FIG. 6 shows another example of the screen displayed on the information display terminal.

FIG. 6 shows another example of the screen displayed on the terminal display unit 150 of the information display terminal 100. An example where a predicted value of a point cloud amount which can be subsequently measured and acquired is added to an existing value indicating that a point cloud has been already acquired and such an addition value is displayed will be described with reference to FIG. 6. For example, it is assumed that a stage before FIG. 6 is a state in which the surveying device 200 has been already placed at a certain position SP and a point cloud has been acquired as in FIG. 5. On the other hand, when the surveying device 200 is placed at a new position NSP, a predicted value indicating a point cloud to be acquired and added is calculated, and for an area overlapping in terms of an observation area, an addition value is calculated by addition of the predicted value to an existing value. Then, unit segments in a display area are displayed according to a point cloud amount as the addition value. For example, a unit segment GU3 is a unit segment where the observation area of the surveying device 200 at the position SP and the observation area of the surveying device 200 at the position NSP overlap with each other. In such a unit segment GU3, the point cloud amount as the measured existing value at the position SP and the point cloud amount as the predicted value to be acquired by measurement at the position NSP are added up, and such an addition value is displayed. Thus, the point cloud amount in the unit segment GU3 is displayed in a color darker than that in a unit segment GU4 where observation areas at two points do not overlap with each other. With this configuration, the operator 2 can perform surveying while thinking about the installation location of the surveying device 200 for acquiring a point cloud and efficiently proceeding with the work.

Figure 7:
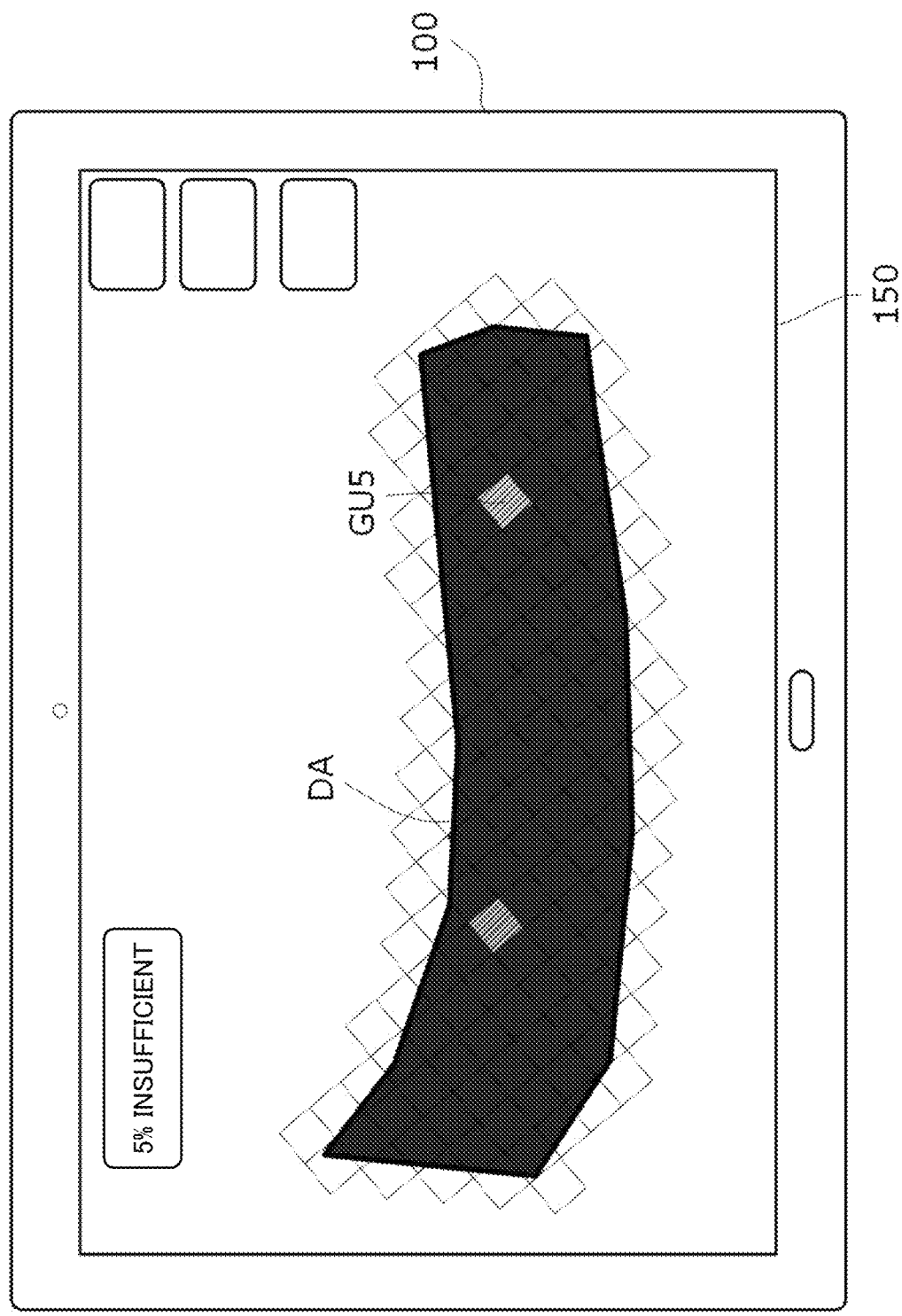
FIG. 7 shows another example of the screen displayed on the information display terminal.
Figure 8:
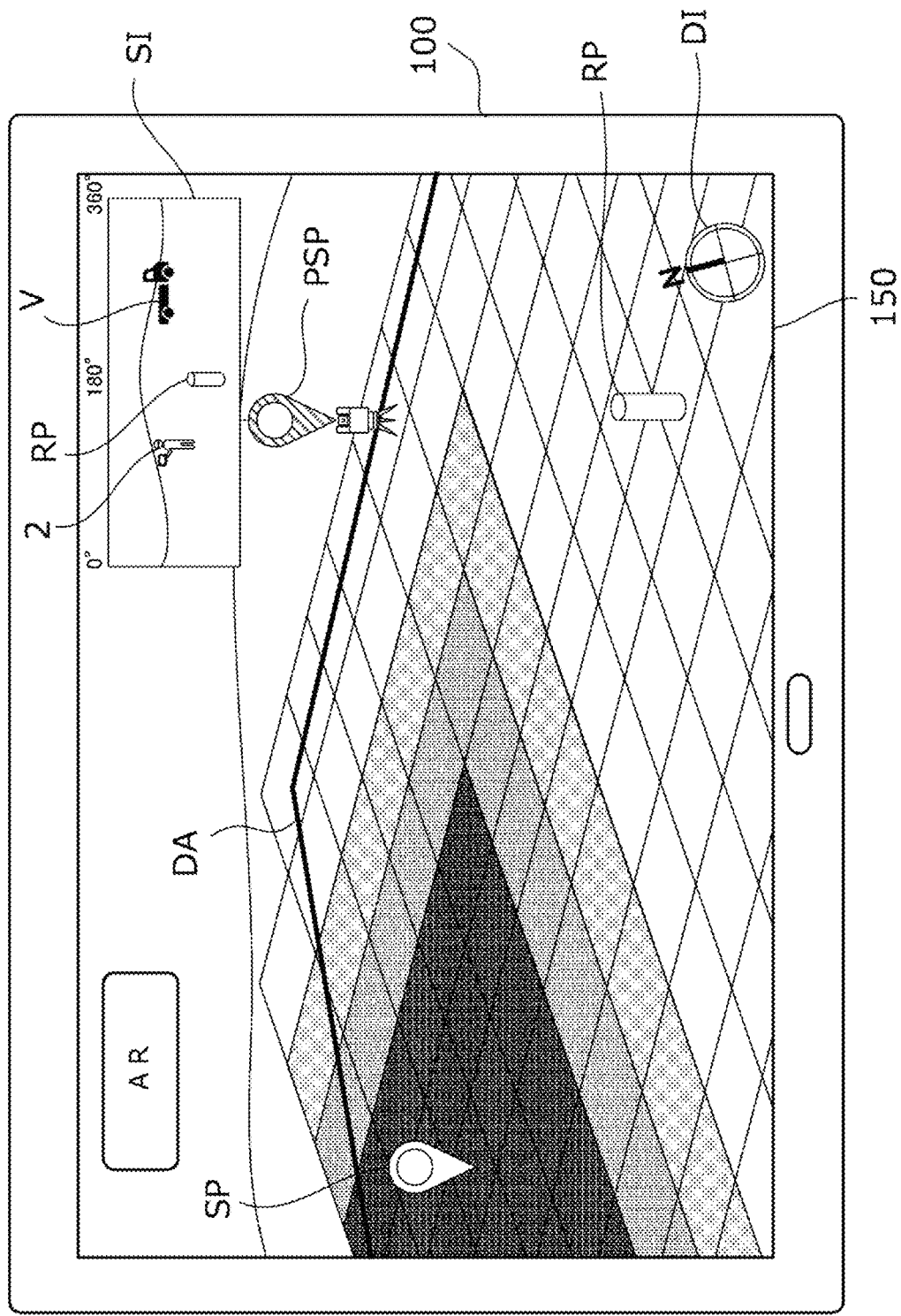
FIG. 8 shows another example of the screen displayed on the information display terminal.

FIG. 7 shows another example of the screen displayed on the terminal display unit 150 of the information display terminal 100. An example of a displayed alert regarding, e.g., a sufficiency rate will be described with reference to FIG. 7. The unit segments in the display area DA shown in FIG. 8 show a high point cloud amount across almost the entire area, but as indicated by "5% insufficient" on the upper left side on the screen, some segments show small point cloud amounts. For example, a unit segment GU5 is a unit segment for which the point cloud amount is less than the necessary point cloud amount, and for differentiating such a unit segment from the other unit segments, the unit segment GU5 is hatched for alerting. Whether or not the alert is to be displayed is determined by the point cloud amount management unit 126 based on the level of the point cloud amount in the unit segment as compared with the necessary point cloud amount stored in advance as described above. The alert is displayed for the unit segment not reaching the necessary point cloud amount as described above so that the operator 2 can fully perform a point cloud acquisition process. For a unit segment with a low point cloud data accuracy, the alert is displayed, and the surveying position of the surveying device 200 having measured the point cloud data, the method for installing such a surveying device 200, etc. are checked again for requesting re-measurement. Thus, the point cloud data accuracy can be easily improved.

Further, in Step S106, the terminal position acquisition unit 160 acquires the position information on the information display terminal 100.

In Step S107, the point cloud amount display unit 125 adjusts the position information, which is acquired in Step S106, on the information display terminal 100 and the local coordinates including the display area for the point cloud to each other.

Then, in Step S108, the position (terminal position) of the information display terminal 100 is displayed on the terminal display unit 150. For example, in the case of FIG. 6 as described above, the position of the information display terminal 100 is, as a terminal position T, displayed on the unit segment displayed in Step S105 on the terminal display unit 150.

In Step S109, the point cloud amount display unit 125 superimposes the unit segments and the point cloud amounts on the image captured by the terminal imaging unit 180 in the three-dimensional space according to the position of the information display terminal 100 on the local coordinates and the imaging direction of the terminal imaging unit 180. The two-dimensional image display described so far and AR display are switchable as necessary by switching operation via the terminal input unit.

FIG. 8 shows an example of an AR display screen on the terminal display unit 150 of the information display terminal 100. As shown in FIG. 8, the terminal display unit 150 directly displays, upon the AR display, the image captured by the terminal imaging unit 180, and unit segments and a point cloud amount in each unit segment are displayed according to a color on such an image. In addition, in FIG. 8, the current installation position PSP of the surveying device 200, the surveying device position SP of the surveying device 200 at the time of previous surveying, the position RP of a reference point, and orientation information D are displayed as icons. Further, a panoramic image captured by the surveying instrument imaging unit 290 is popped up on the surveying device 200 at the time of current surveying. This panoramic image includes a scene viewed from the surveying instrument imaging unit 290, and for example, includes the operator 2, the reference point RP which is also displayed upon the AR display, a moving object V, and the like.

Further, in Step S110, remote control such as an instruction for measuring a point cloud is performed for the specified surveying device 200 via the terminal input unit 140. For example, in FIG. 8, when the operator 2 selects the current installation position PSP of the surveying device 200 displayed on the terminal display unit 150, a surveying setting screen (not shown) is opened. When the operator 2 inputs surveying conditions on the surveying setting screen to execute surveying, the surveying device 200 surveys a point cloud according to the surveying conditions. With the panoramic image captured by the surveying instrument imaging unit 290, the operator 2 can specify the orientation of the surveying device 200 from the reference point RP which is also displayed upon the AR display. For example, the operator 2 performs the operation of selecting the reference point RP on the panoramic image so that the operator 2 can instruct the approximate position of reference point scanning for installing the surveying device 200 at the instrument point based on the reference point PR. In response to such an instruction, the surveying device 200 observes the reference point RP selected by the operator 2, and specifies instrument coordinates on the local coordinates. In addition, the operator 2 sets, as the surveying condition, an area where surveying can be performed in the display area DA, and the surveying device 200 measures a point cloud in an area other than an area outside the display area.

As described above, the surveying information management system of the embodiment of the present disclosure uses the information display terminal 100 and the surveying device 200 configured to measure a point cloud in the three-dimensional space, and includes the surveying information acquisition unit 121 configured to acquire, from the surveying device 200, the surveying information including the point cloud data associated with the position information, the area setting unit 122 configured to set a display area for the point cloud, the segment setting unit 123 configured to divide the display area into the predetermined unit segments, the point cloud amount calculation unit 124 configured to calculate the point cloud amount in the space of each of the unit segments, the point cloud amount display unit 125 configured to display, on the information display terminal, the information according to the point cloud amount calculated for each of the unit segments of the display area by the point cloud amount calculation unit, and the terminal position acquisition unit 160 capable of acquiring the position information on the terminal position acquisition unit 160. The point cloud amount display unit 125 is capable of adjusting the position information acquired by the terminal position acquisition unit 160 and the local coordinates including the point cloud display section to each other and displaying, on the information display terminal 100, the position of the information display terminal 100 on the local coordinates. With this configuration, it can be easily checked whether or not a necessary number of pieces of data including not only the position of the information display terminal 100 but also the point cloud amount is, as the three-dimensional point cloud data, acquired for each segment of the display area where the point cloud amount needs to be managed. Thus, scanning can be efficiently performed at the site, and a scanning status and a data acquisition result can be visually checked.

Particularly, the point cloud amount display unit 125 adjusts the information display terminal 100 and the local coordinates to each other according to user operation when the information display terminal 100 is positioned at the known point on the local coordinates. With this configuration, the position information on the information display terminal 100 can be easily adjusted to the local coordinates.

In addition, the point cloud amount display unit 125 displays the unit segments and the position of the surveying device 200 so as to superimpose such information on the image captured by the terminal imaging unit 180 according to the position of the information display terminal 100 on the local coordinates and the imaging direction of the terminal imaging unit 180. With this configuration, the operator 2 can more easily grasp a surveying status at the site.

In addition, the point cloud measurement area can be, via the terminal input unit 140, instructed to the surveying device 200 whose position is displayed so as to be superimposed on the image. With this configuration, scanning can be more efficiently performed at the site.

In addition, the surveying device 200 can survey a point cloud with a limitation to the inside of the display area for the point cloud set by the area setting unit 122. With this configuration, unnecessary point cloud measurement can be reduced, and the efficiency of scanning at the site can be further enhanced.

In addition, the point cloud amount management unit 126 is further provided, which is configured to display, on the information display terminal, the information indicating the point cloud insufficiency when there is a segment whose point cloud amount does not reach the predetermined necessary point cloud amount among the segments of the display area. With this configuration, the operator 2 can fully perform the point cloud acquisition process.

In addition, the point cloud amount calculation unit 124 calculates the point cloud amount in the space within the predetermined altitude range in each unit segment, and the point cloud amount display unit 125 displays each segment on the information display terminal 100 according to the point cloud amount within the predetermined altitude range. With this configuration, the point cloud acquisition status within a desired altitude range can be checked.

In addition, the point cloud amount calculation unit 124 calculates the indicator regarding the sufficiency for the necessary point cloud amount in the display area or the unit segment, and the point cloud amount display unit 125 displays the indicator regarding the sufficiency on the information display terminal 100. With this configuration, the point cloud acquisition status can be quantitatively checked.

In addition, the surveying information acquisition unit 121 acquires the position information on the surveying device 200, the point cloud amount calculation unit 124 calculates, based on the position of the surveying device 200, the predicted values of the area and the point cloud amount which can be acquired in the case of surveying a point cloud at such a position, and the point cloud amount display unit 125 displays each segment on the information display terminal according to the predicted values. With this configuration, the operator 2 can understand how to acquire a point cloud when the surveying device 200 is placed at such a position, and the point cloud acquisition process can be efficiently proceeded.

In addition, the point cloud amount calculation unit 124 calculates, when the predicted values are calculated and there is an overlapping segment already having a point cloud amount as an existing value calculated based on the surveying information within the predicted area, the addition value of the calculated point cloud amount and the predicted value of the point cloud amount for the overlapping segment, and the point cloud amount display unit 125 displays each segment on the information display terminal 100 according to the addition value. With this configuration, the operator 2 can understand how to acquire a point cloud amount when the surveying device 200 is placed at such a position, considering the record of segments for which measurement has been already previously performed. Moreover, the point cloud acquisition process can be efficiently proceeded.

In addition, the point cloud amount calculation unit 124 targets, for calculation of the point cloud amount, only the point cloud data satisfying the predetermined conditions based on, e.g., a measured distance and an incident angle among the point cloud data acquired by the surveying information acquisition unit 121. With this configuration, unnecessary data can be reduced, and the efficiency of the point cloud data processing can be enhanced.

In addition, the point cloud amount management unit 126 calculates the accuracy of installation of the surveying device 200 at the instrument point based on the point cloud data measured from the plurality of installation positions, and displays the information regarding the accuracy of installation at the instrument point. With this configuration, the appropriateness of installation at the instrument point can be easily checked, and such installation can be easily corrected. Moreover, the efficiency of scanning can be further enhanced.

One embodiment of the present disclosure has been described above. However, an aspect of the present disclosure is not limited to the foregoing embodiment.

For example, in the above-described embodiment, the scanner unit 260 of the surveying device 200 is the laser scanner, but the scanner unit that performs measurement to acquire the three-dimensional point cloud data is not limited thereto. For example, light detection and ranging (LIDAR) for performing distance measurement by measurement of scattered light from a laser beam emitted in a pulse form may be used for the scanner unit. Alternatively, an imaging unit such as a camera may be provided as the scanner unit, and the point cloud data generation unit may generate the point cloud data from one or more images captured by the imaging unit using a so-called structure from motion (SfM) or photogrammetry method.

In addition, in the above-described embodiment, the example where the unit segments and the point cloud amount in each unit segment are displayed on the terminal display unit 150 of the information display terminal 100 has been described, but these pieces of information may be displayed on other display units. For example, the unit segments and the information on each unit segment may be transmitted to the surveying device, and the surveying instrument display unit of the surveying device serving as the information terminal display unit of the present invention may display the unit segments and the information on the point cloud amount in each unit segment.

In the flow of processing in the above-described embodiment, the processing relating to the AR display from Steps S106 to S110 is performed after the processing relating to point cloud amount display from Steps S101 to S105 in FIG. 2, but the order of processing is not limited to above. For example, the processing from Steps S106 to S110 may be performed first. In other words, the point cloud may be measured by the surveying device by the remote control based on the AR display in the information display terminal (the processing from Steps S106 to S110), and then, the point cloud amount based on the three-dimensional point cloud data acquired by such measurement may be displayed (the processing from Steps S101 to S105).

What is claimed is:

1. A surveying information management system for displaying surveying information by using an information display terminal and a surveying device configured to measure a point cloud in a three-dimensional space, the system comprising:
    a surveying information acquisition unit configured to acquire, from the surveying device, the surveying information including point cloud data associated with position information;
    an area setting unit configured to set a display area for the point cloud;
    a segment setting unit configured to divide the display area into predetermined unit segments;
    a point cloud amount calculation unit configured to calculate a point cloud amount in a space of each of the unit segments;
    a point cloud amount display unit configured to display, on the information display terminal, information according to the point cloud amount calculated for each of the unit segments of the display area by the point cloud amount calculation unit; and
    a terminal position acquisition unit capable of acquiring position information on the information display terminal, wherein
    the point cloud amount display unit adjusts the position information acquired by the terminal position acquisition unit and local coordinates including the display area for the point cloud to each other so that a position of the information display terminal on the local coordinates can be displayed on the information display terminal.

2. The surveying information management system of claim 1, further comprising:
    a point cloud amount management unit configured to display information indicating a point cloud insufficiency on the information display terminal when there is a segment whose point cloud amount does not reach a predetermined necessary point cloud amount among the segments of the display area.

3. The surveying information management system of claim 1, wherein the point cloud amount calculation unit calculates the point cloud amount in a space within a predetermined altitude range for each of the unit segments, and
    the point cloud amount display unit displays, for each of the segments, information according to the point cloud amount in the space within the predetermined altitude range on the information display terminal.

4. The surveying information management system of claim 1, wherein
    the point cloud amount calculation unit calculates an indicator regarding a sufficiency for a necessary point cloud amount in the display area or each of the unit segments, and
    the point cloud amount display unit displays the indicator regarding the sufficiency on the information display terminal.

5. The surveying information management system of claim 1, wherein
    the surveying information acquisition unit acquires the position information on the surveying device,
    the point cloud amount calculation unit calculates, based on a position of the surveying device, predicted values of an area and a point cloud amount that can be acquired when a point cloud is surveyed at the position of the surveying device, and
    the point cloud amount display unit displays each of the segments according to the predicted values on the information display terminal.

6. The surveying information management system of claim 5, wherein
    the point cloud amount calculation unit calculates, when the predicted values are calculated and there is an overlapping segment already having a point cloud amount as an existing value calculated based on the surveying information within the predicted area, an addition value of the calculated point cloud amount and the predicted predicated value of the point cloud amount for the overlapping segment, and
    the point cloud amount display unit displays each of the segments according to the addition value on the information display terminal.

7. The surveying information management system of claim 1, wherein the point cloud amount calculation unit targets, for calculation of the point cloud amount, only point cloud data satisfying a predetermined condition among the point cloud data acquired by the surveying information acquisition unit.

8. The surveying information management system of claim 1, further comprising:
    a point cloud amount management unit configured to calculate an accuracy of installation of the surveying device at an instrument point based on point cloud data measured from a plurality of installation positions and display information regarding the accuracy of the installation at the instrument point on the information display terminal.

9. The surveying information management system of claim 1, wherein
    the point cloud amount display unit adjusts the position information on the information display terminal and the local coordinates to each other according to user operation when the information display terminal is positioned at a known point on the local coordinates.

10. The surveying information management system of claim 1, further comprising:
    a terminal imaging unit capable of capturing an image from the information display terminal; and
    a terminal orientation acquisition unit capable of detecting an imaging direction of the terminal imaging unit, wherein the point cloud amount display unit is capable of displaying and superimposing the unit segments on the image captured by the terminal imaging unit according to the position of the information display terminal on the local coordinates and the imaging direction of the terminal imaging unit.

11. The surveying information management system of claim 10, wherein
the point cloud amount display unit is capable of displaying and superimposing the position of the surveying device on the image captured by the terminal imaging unit.

12. The surveying information management system of claim 11, further comprising:
a terminal input unit capable of instructing a point cloud measurement area to the surveying device whose position is displayed so as to be superimposed on the image.

13. The surveying information management system of claim 1, wherein
the surveying device is capable of measuring a point cloud with a limitation to an inside of the display area for the point cloud set by the area setting unit.

14. The surveying information management system of claim 1, wherein
the point cloud amount calculation unit targets, for calculation of the point cloud amount, only a point cloud within a predetermined distance from the surveying device among point clouds acquired by the surveying device.

15. A surveying information management method for displaying surveying information by using an information display terminal and a surveying device, the method comprising:
acquiring, from the surveying device, the surveying information including point cloud data associated with position information by a surveying information acquisition unit;
setting a display area for the point cloud by an area setting unit;
dividing the display area into predetermined unit segments by a segment setting unit;
calculating a point cloud amount in a space of each of the unit segments by a point cloud amount calculation unit;
displaying, on the information display terminal, information according to the point cloud amount calculated for each of the unit segments of the display area in the calculating of the point cloud amount, by a point cloud amount display unit; and
acquiring position information on the information display terminal, by a terminal position acquisition unit, wherein
the point cloud amount display unit adjusts the position information acquired by the terminal position acquisition unit and local coordinates including the display area for the point cloud to each other so that a position of the information display terminal on the local coordinates is displayed on the information display terminal.

16. A non-transitory storage medium storing a surveying information management program for displaying surveying information by using an information display terminal and a surveying device, the non-transitory storage medium causing a computer to execute:
acquiring, from the surveying device, the surveying information including point cloud data associated with position information by a surveying information acquisition unit;
setting a display area for the point cloud by an area setting unit;
dividing the display area into predetermined unit segments by a segment setting unit;
calculating a point cloud amount in a space of each of the unit segments by a point cloud amount calculation unit;
displaying, on the information display terminal, information according to the point cloud amount calculated for each of the unit segments of the display area in the calculating of the point cloud amount, by a point cloud amount display unit; and
acquiring position information on the information display terminal, by a terminal position acquisition unit, wherein
the point cloud amount display unit adjusts the position information acquired by the terminal position acquisition unit and local coordinates including the display area for the point cloud to each other so that a position of the information display terminal on the local coordinates is displayed on the information display terminal.

* * * * *